May 6, 1941. G. SMITH 2,241,276

TOOTH FENDER FOR HARROWS AND CULTIVATORS

Filed Oct. 19, 1938

Inventor

Garland Smith.

By Clarence A. O'Brien
and Hyman Berman
Attorneys

Patented May 6, 1941

2,241,276

UNITED STATES PATENT OFFICE 2,241,276

TOOTH FENDER FOR HARROWS AND CULTIVATORS

Garland Smith, Bassfield, Miss., assignor of one-half to Lacy Lott, Purvis, Miss., and one-half to Wilmer J. Morris, Hattiesburg, Miss.

Application October 19, 1938, Serial No. 235,895

2 Claims. (Cl. 97—188)

My invention relates generally to a fender for assembly with the standard spring tooth of an ordinary side harrow or cultivator for use when cultivating small plants, to avoid covering them up and to enable the operator to cultivate close up to the plants without any injury to the plants, and an important object of my invention is to provide a simple and efficient arrangement of this character.

Another important object of my invention is to provide a fender of the character indicated which can be installed and detached without the use of any tools, and which involves attaching means which takes the place of the usual bolt holding the tooth to the body of the cultivator, thereby performing the offices of the bolt and of a means of attachment for the fender.

Other important objects and advantages of my invention will be apparent from a reading of the following description taken in connection with the drawing, wherein for purposes of illustration I have set forth a preferred embodiment of my invention.

In the drawing—

Figure 3:
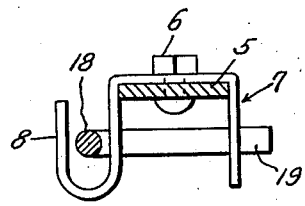
Figure 3 is an enlarged transverse vertical sectional view taken through Figure 2 approximately on the line 3—3 and looking toward the left in the direction of the arrow.

Referring in detail to the drawing, the numeral 5 generally designates an ordinary standard spring tooth of a cultivator or side harrow which in accordance with the present invention has mounted on the terminal of the horizontal portion thereof by means of a bolt or rivet 6 the cuff which is generally designated 7 and which comprises a flat bar bent into U-shape as shown in Figure 3 with one of the legs provided with a J-shaped extension 8 which is cut away as indicated by the numeral 9 from the upper rear corner thereof to provide clearance for withdrawing the fender rod in a manner to be described.

The fender which is generally designated 10 comprises a generally rectangular vertical metal plate 11 which is angularly cut away at its front lower corner as indicated by the numeral 12, the plate 11 having fastened to the longitudinal middle thereof the generally horizontal portion 13 of the fender supporting rod 15, the attachment to the plate 13 being made by means of bolts or rivets 14. Intermediate its ends the fender supporting rod 15 is angulated as indicated by the numeral 16 to reach the level of the cuff 7 where a bend 17 provides the horizontal portion 18 which has at its terminal the right angularly directed portion 19 which turns in and passes through aligned openings in the legs of the U-shaped cuff as clearly indicated in the drawing, the portion 19 then being aligned with the space provided by the cut away portion 9.

Figure 1:
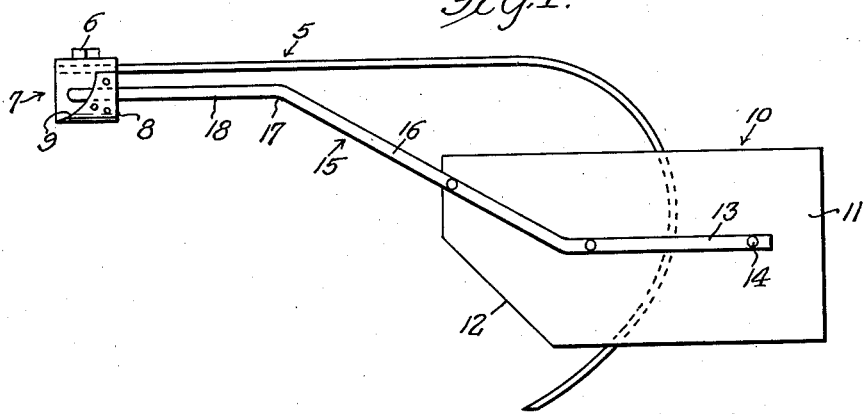
Figure 1 is a general side elevational view showing an embodiment of the invention.
Figure 2:
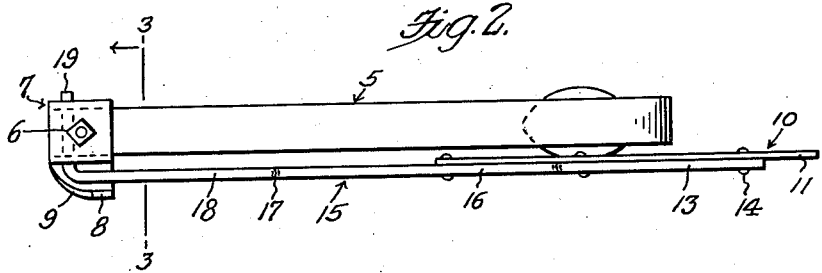
Figure 2 is a top plan view of Figure 1.
Figure 4:
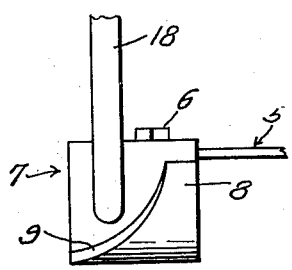
Figure 4 is an enlarged side elevational view of the fender mounting cuff and showing the fender rod in a vertical position in which it is removable by sliding the same in an outboard direction.

To install the fender of the present invention the supporting rod 15 is elevated to the position indicated in Figure 4 and the portion 19 passed through the journal holes in the legs of the cuff 7 until the portion 18 is close enough to the side of the cuff to permit its being let down to the position illustrated in Figure 3 of the drawing, in which position the fender will be retained in a mounted position on the spring tooth 5 and the plate 11 will be free to ride up and down along the ground in accordance with the unevenness of the ground and in proper position alongside the point of the spring tooth, as illustrated in Figure 2 of the drawing. To remove the fender from the spring tooth, it is necessary only to raise the plate equipped end of the rod 15 until the portion 18 can clear the projection 8 and come substantially into the position illustrated in Figure 4, when the parts permit lateral withdrawal of the rod portion 19 from the legs of the cuff.

Although I have shown and described herein a preferred embodiment of my invention, it is to be definitely understood that I do not desire to limit the application of the invention hereto, and any change or changes may be made in the structure and arrangement of the parts, within the spirit of the invention and the scope of the subjoined claims.

Having described the invention, what is claimed as new is:

1. A fender adapted for attachment to the horizontal shank of a cultivator tooth, said fender comprising a cuff consisting of a substantially U-shaped member having its bight portion secured to said shank and having its legs extending in vertical positions, said legs being formed with transversely aligned holes, a lateral extension on one of said legs, said extension comprising a vertical wall and a connecting portion connecting said vertical wall in laterally spaced relation to said one leg, a fender comprising a normally horizontal fender bar having a laterally directed pintle on one end extending through and journalled in said holes in the legs, with said fender bar resting on said connecting portion and retained between the said one leg and said vertical wall, said vertical wall being discontinuous at a point substantially in alignment with said holes to permit said fender bar to be moved laterally beyond said vertical wall to effect withdrawal of said pintle from the said holes while said fender bar is elevated sufficiently to clear said vertical wall.

2. A fender adapted for attachment to the horizontal shank of a cultivator tooth, said fender comprising a cuff consisting of an inverted U-shaped member, means for securing the bight portion of said member to said cultivator tooth shank with the legs of said member depending at opposite sides of said shank, said legs being formed with transversely aligned holes, a laterally outwardly and upwardly directed extension on one of said legs and defining with said one leg a channel, said fender further comprising a fender bar having a laterally directed pintle on one end passing through and journalled in said holes, said fender bar normally resting in said channel in a substantially horizontal position, the laterally outward wall of said channel being discontinuous as a point in alignment with the said holes to permit laterally outward withdrawal of said pintle from said holes only while said fender bar is in a sufficiently elevated position to clear said laterally outward wall.

GARLAND SMITH.